United States Patent [19]

Rohrle et al.

[11] Patent Number: 5,667,053

[45] Date of Patent: Sep. 16, 1997

[54] TORSIONAL DAMPER WITH A SEALED ANNULAR HOUSING, ESPECIALLY FOR A MOTOR VEHICLE

[75] Inventors: Dieter Rohrle, Montmorency; Ciriaco Bonfilio, Clichy, both of France

[73] Assignee: Valeo, Cedex Paris, France

[21] Appl. No.: 507,310

[22] PCT Filed: Dec. 19, 1994

[86] PCT No.: PCT/FR94/01485

§ 371 Date: Sep. 18, 1995

§ 102(e) Date: Sep. 18, 1995

[87] PCT Pub. No.: WO95/17617

PCT Pub. Date: Jun. 29, 1995

[30] Foreign Application Priority Data

Dec. 23, 1993 [FR] France .................. 93 15571

[51] Int. Cl.⁶ .................................... F16F 15/12
[52] U.S. Cl. ................. 192/214.1; 74/574; 192/208
[58] Field of Search .................. 192/214.1, 214, 192/208, 70.17; 464/66, 67, 68; 74/574

[56] References Cited

U.S. PATENT DOCUMENTS

| 5,073,143 | 12/1991 | Friedmann et al. | 74/574 X |
|---|---|---|---|
| 5,146,811 | 9/1992 | Jackel | 74/574 |
| 5,273,372 | 12/1993 | Friedmann et al. | 192/208 X |
| 5,393,266 | 2/1995 | Braun et al. | 464/68 X |
| 5,415,261 | 5/1995 | Friedmann | 74/574 X |
| 5,435,783 | 7/1995 | Rohrle | 464/68 |
| 5,471,896 | 12/1995 | Schierling et al. | 464/68 X |
| 5,518,100 | 5/1996 | Birk et al. | 192/208 |

FOREIGN PATENT DOCUMENTS

| 0529669 | 3/1993 | European Pat. Off. . |
|---|---|---|
| 7926142 | 3/1981 | Germany . |
| 2176225 | 7/1990 | Japan . |
| 2217429 | 10/1989 | United Kingdom . |
| 2219647 | 12/1989 | United Kingdom . |
| 2262587 | 6/1993 | United Kingdom . |

OTHER PUBLICATIONS

Patent Abstracts of Japan vol. 14, No. 447 (M–1029) Sep. 1990.

*Primary Examiner*—Rodney H. Bonck
*Attorney, Agent, or Firm*—Longacre & White

[57] ABSTRACT

The torsion damper comprises a first rotating element (12) delimiting the greater part of a sealed annular housing (30) which receives a resilient damper (32) and a lubricating agent for this damper. A second rotating element (14) Comprises a disc (36) which penetrates into the sealed housing (30). Sealing rings close the housing (30) sealingly. Each sealing ring is mounted in axial compression between two support surfaces, one of which consists of an annular ridge carried by the disc (36), while the other consists of a shoulder formed on the other rotating element.

7 Claims, 7 Drawing Sheets

TORSIONAL DAMPER WITH A SEALED ANNULAR HOUSING, ESPECIALLY FOR A MOTOR VEHICLE

This application is entitled to the benefits of international application, PCT/FR94/01485, filed Dec. 19, 1994 as prescribed by 35 U.S.C. 271.

BACKGROUND OF THE INVENTION a) Field of the Invention

The present invention relates to a torsion damper, especially for a motor vehicle, such as is described and illustrated by way of example in the documents GB-A-2 219 647 and DE-U-79 26 142.

b) Description of Related Art

The damper described in GB-A-2 219 647 and DE-U-79 26 142 comprises a first rotating element and a second rotating element, which define between them an annular housing that receives a resilient damping means acting circumferentially between the two rotating elements.

It is desirable to lubricate the various components of the resilient damping means, and especially the springs that are comprised in such a damping means, together with their associated support zones formed on the rotating elements.

For that reason, it has been proposed in the above mentioned documents to seal the boundaries of the said annular housing so that it contains a lubricating agent, such as grease, which is unable to penetrate radially inwardly between the two rotating elements.

In order to ensure that the housing is sealed in the radially inward direction, the document DE-U-79 26 142 proposed sealing means which comprise two axial sealing rings, each of which is in engagement, through one of its surfaces, against a first support surface associated with the first rotating element, and through the other one of its surfaces against a second support surface associated with the second rotating element.

In the embodiment proposed in that document, each of the support surfaces is provided by an annular O-ring seal fitted in all annular groove, which is arranged for this purpose in a surface portion formed, in facing relationship, in each of the two rotating elements, while each sealing ring is retained radially by simple frictional contact of its opposed faces with the two corresponding O-ring seals.

More precisely, in the said document, the greater part of the annular housing is delimited by at least two components of a first one of the rotating elements, with the second rotating element comprising a disc which penetrates into the said housing.

Thus, one of the support surfaces is formed on the disc, with the said sealing rings being disposed on either side of the said disc.

The arrangement of the sealing means proposed in that document is particularly complex and expensive, in that it calls for a large number of components, in that it makes it necessary to carry out groove machining to precise dimensions for the O-ring seals, and in that assembly of the various components, in order to ensure correct positioning of the sealing rings between their corresponding seals, is particularly difficult to carry out and to automate.

In addition, the rings can evert, depending on manufacturing tolerances, especially in the O-ring seals.

Moreover, the above mentioned disc of the rotating element concerned has to have a not insignificant thickness so that the grooves can be formed. In this connection, the torque is transmitted through this disc, which must in consequence be of a predetermined thickness in order to transmit this torque. It is therefore necessary to take account of the grooves in order to determine this thickness.

SUMMARY OF THE INVENTION

An object of the present invention is to propose a torsion damper of the type set forth above, in which the structure of the sealing means for the annular housing is particularly simple, and which overcomes the drawbacks mentioned above.

To this end, the invention proposes a torsion damper of the type set forth above, characterised in that each ring is mounted in axial compression directly between its two support surfaces, and is arranged to bear radially, through one of its circular edges, on an annular support surface formed in facing relationship on one of the elements comprising the first rotating element and the disc of the second rotating element, and through its other circular edge against a shoulder formed in facing relationship on the other one of the elements comprising the first rotating element and the disc of the second rotating element, in that each sealing ring is mounted in axial compression in such a way as to have the form of a frustum of a cone, and in that the said rings are substantially parallel.

In this way, fitting of the ring is simplified, because the latter engages against the said shoulder. In addition, there is no need either to resort to O-ring seals, or to arrange for groove machining. In this connection, sealing is obtained by virtue of the shoulders and annular support ridges in accordance with the invention. In addition, the disc is not unduly weakened.

Moreover, the shoulders and/or the ridges formed in the said disc ate easy to make.

This disc can thus have the minimum thickness, with the advantage of a reduction in the axial size of the damper. In addition, the shoulders and/or the ridges formed in the first rotating element are easy to make. Moreover the danger of eversion of the sealing rings is minimised, because they are in direct engagement.

It will be noted that the parallelism of the rings leads to a reduction in axial size.

Preferably, each radial shoulder comprises a generally cylindrical abutment surface and a support surface which extends generally radially and which defines between the said surfaces a shoulder base against which the associated ring is caused to bear sealingly through one of its circular edges.

This cylindrical abutment surface facilitates fitting of the sealing rings.

According to one feature, each shoulder has a conical support surface which, in transverse cross section, defines an obtuse angle with the cylindrical engagement surface. In a modification, the angle may be acute.

It is thus possible easily to confer a frusto-conical profile on the sealing rings after they have been fitted, this being permitted by the said conical support surfaces.

According to another feature, the apex of the support ridge is offset axially with respect to the base of the associated shoulder. This arrangement again enables the sealing rings to be given a frusto-conical profile.

In one embodiment, the two annular ridges are formed on the disc of the second rotating element.

In another embodiment, the disc has a ridge and a shoulder. Finally, in a third embodiment, both shoulders are formed on the disc.

This arrangement enables both of the sealing rings to be made from a single blank. One of the rings, referred to as the inner ring, is obtained from the unwanted material rejected from the centre of the other ring, referred to as the outer ring. In all cases, the disc is inclined in the region of the sealing rings.

BRIEF DESCRIPTION OF THE DRAWINGS

Further features and advantages of the invention will appear on a reading of the description, and with reference to the attached drawings, in which.

DETAILED DESCRIPTION OF THE INVENTION

Figure 1:
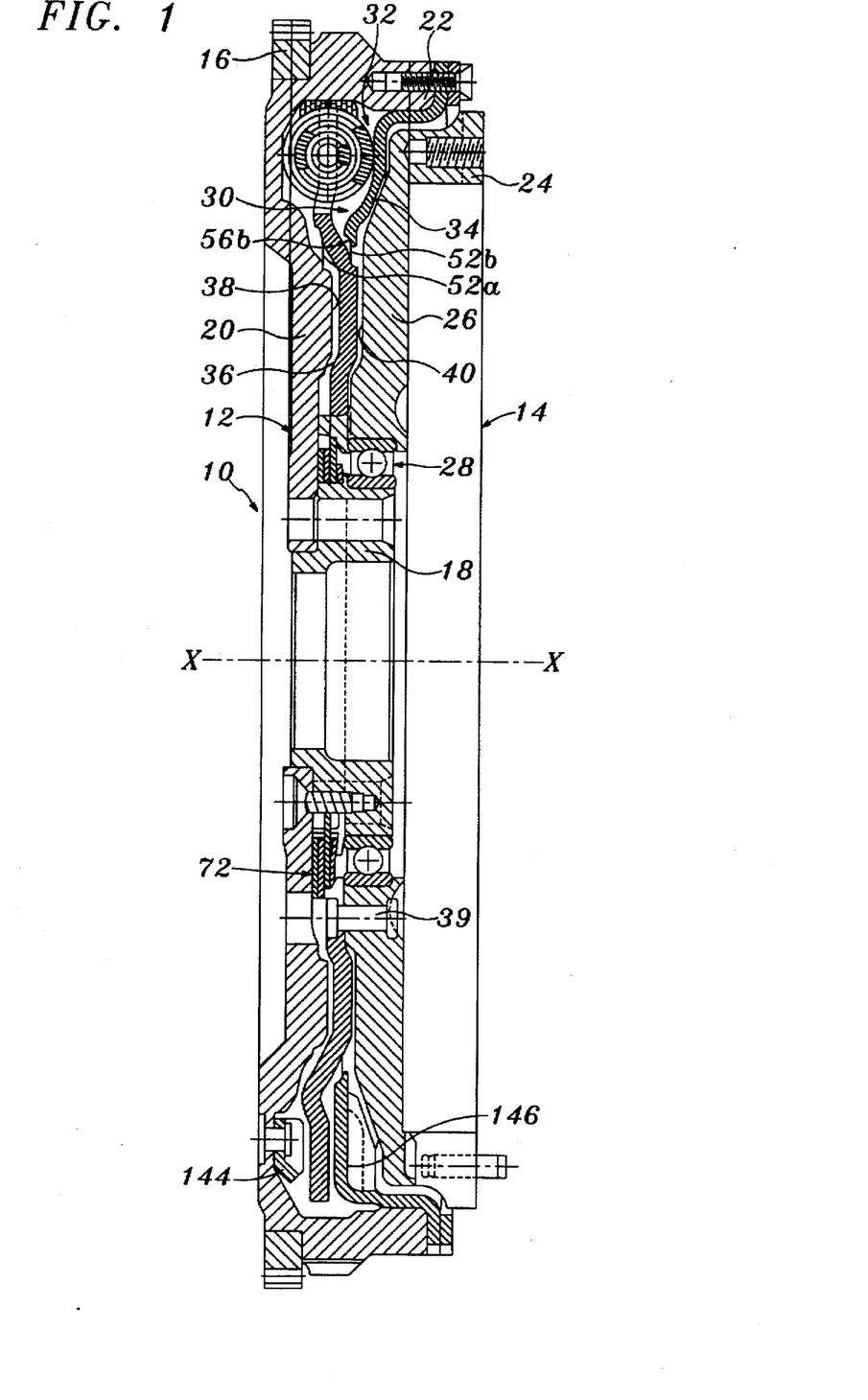
FIG. 1 is a view, in cross section taken on the line 1—1 in FIG. 2, of a torsion damper in the form of a damped flywheel in accordance with the invention.
Figure 2:
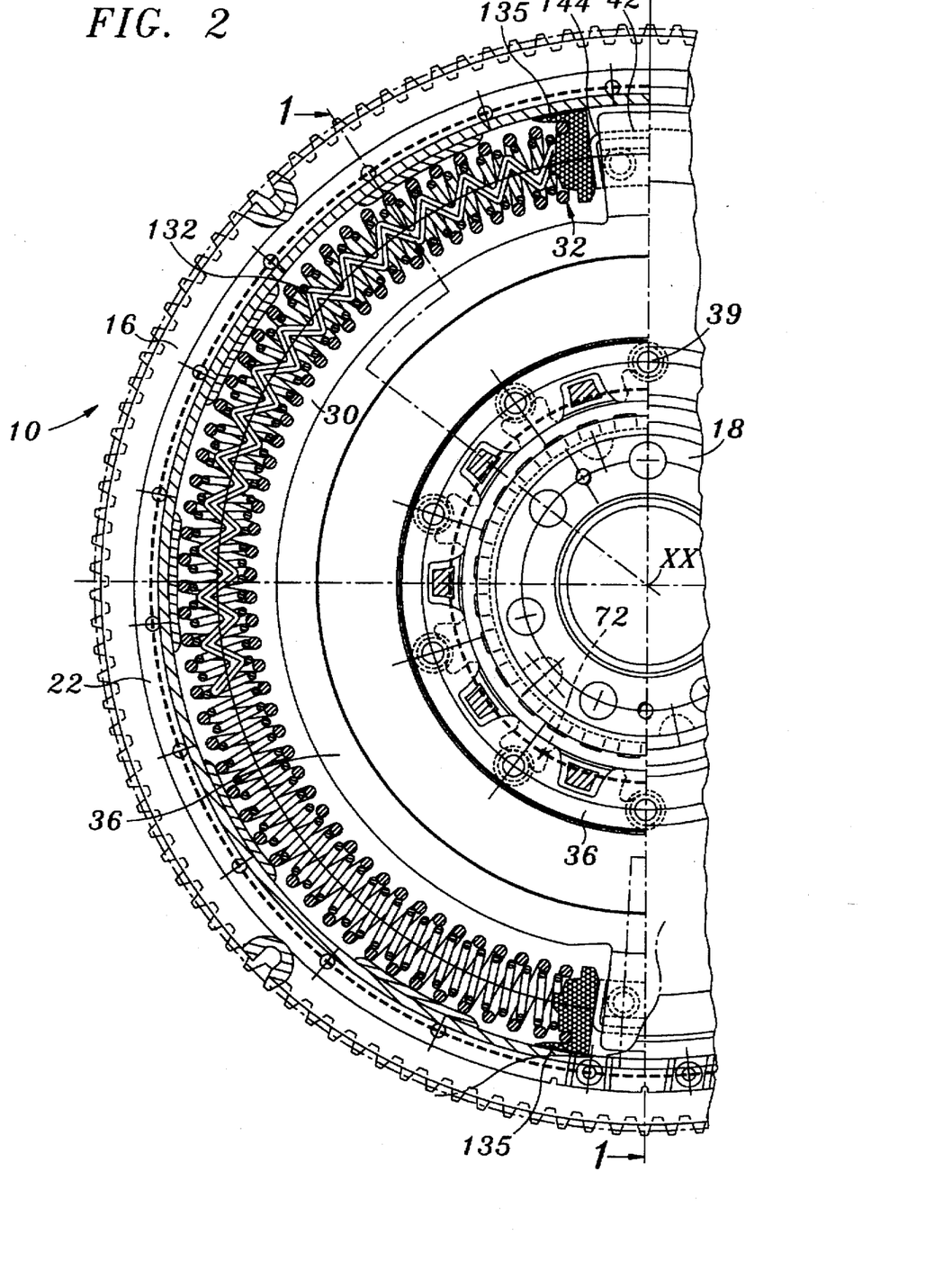
FIG. 2 is an end view, showing partly cut away, of part of the damped flywheel of FIG. 1.
Figure 3:
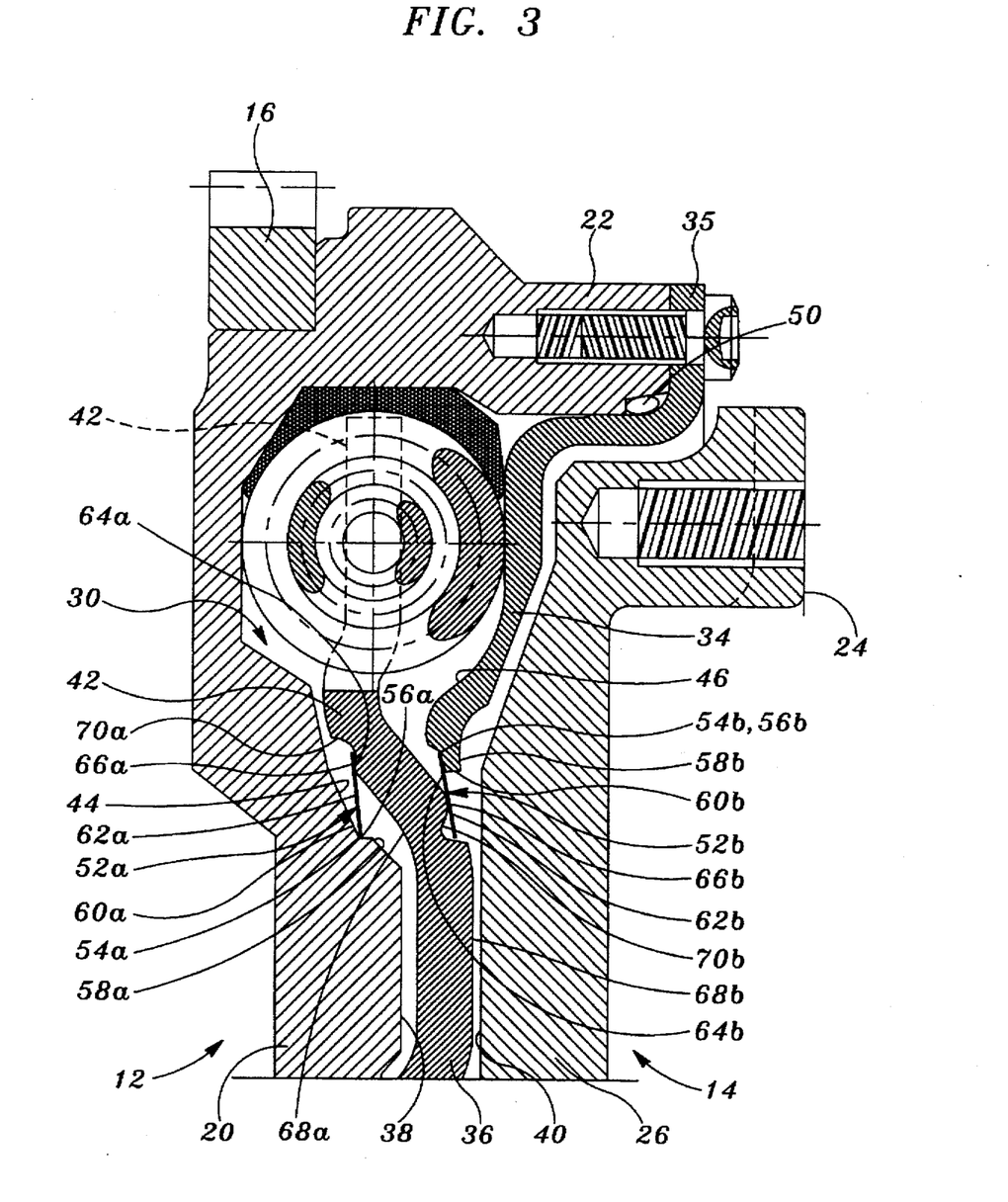
FIG. 3 is a view on a larger scale of the upper part of the damped flywheel of FIG. 1.

FIGS. 1 to 3 show a torsion damper in the form of a damped flywheel 10 for a motor vehicle, which consists essentially of a first rotating element 12 and a second rotating element 14, which are arranged to rotate with respect to each other about an axis X—X against the action of a circumferentially acting resilient damping means 32, which works between the said rotating elements.

The said resilient damping means 32 is mounted in an annular housing 30 defined by the two rotating elements. In this example, the annular housing 30 is bounded mainly by the first rotating element 12, and the second rotating element 14 comprises a disc 36, which penetrates into the said housing 30, which is sealed in a manner to be described later herein.

Figure 4:
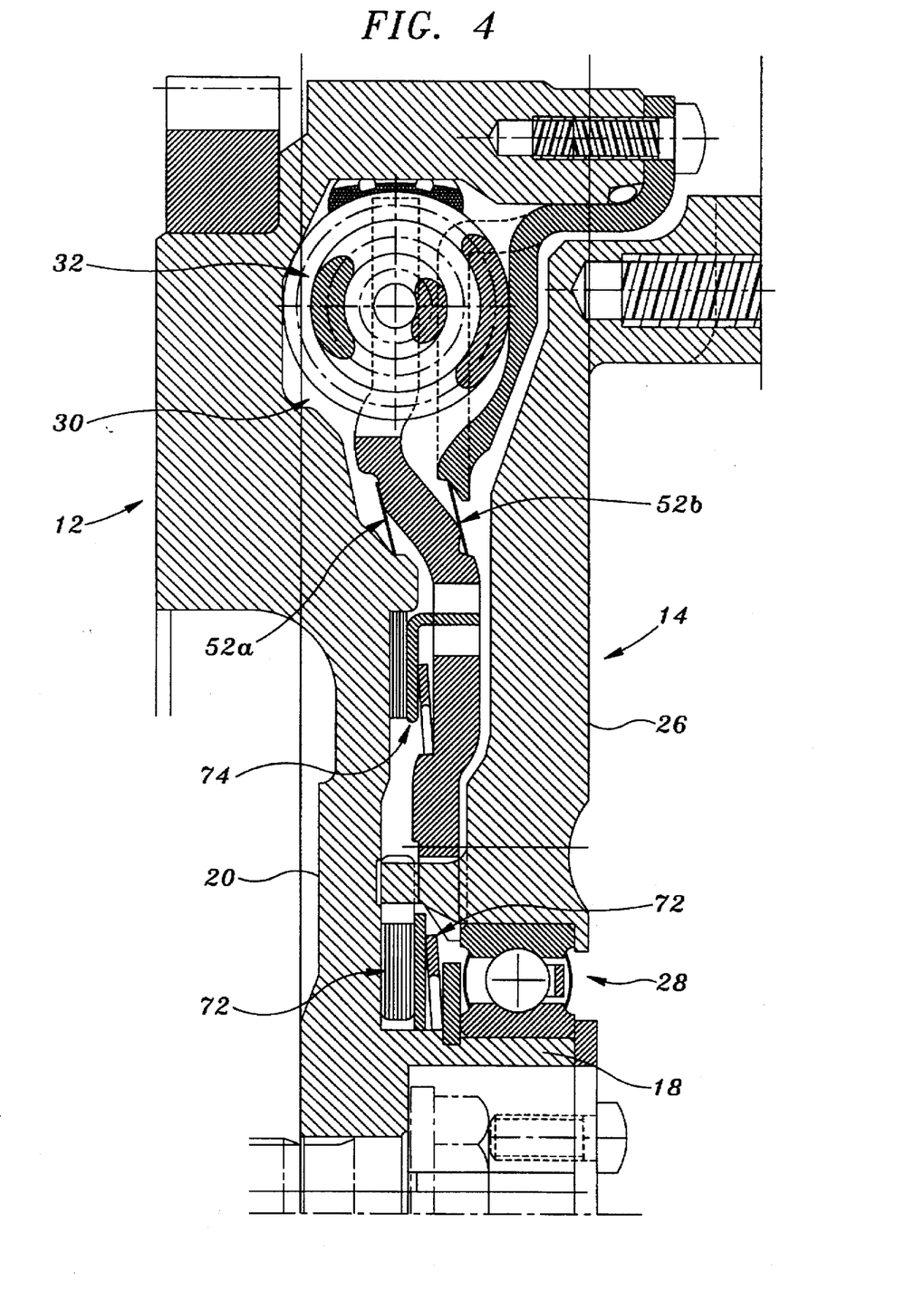
FIG. 4 is a half view, similar to FIG. 1 but showing a second embodiment of a damped flywheel in accordance with the invention.
Figure 5:
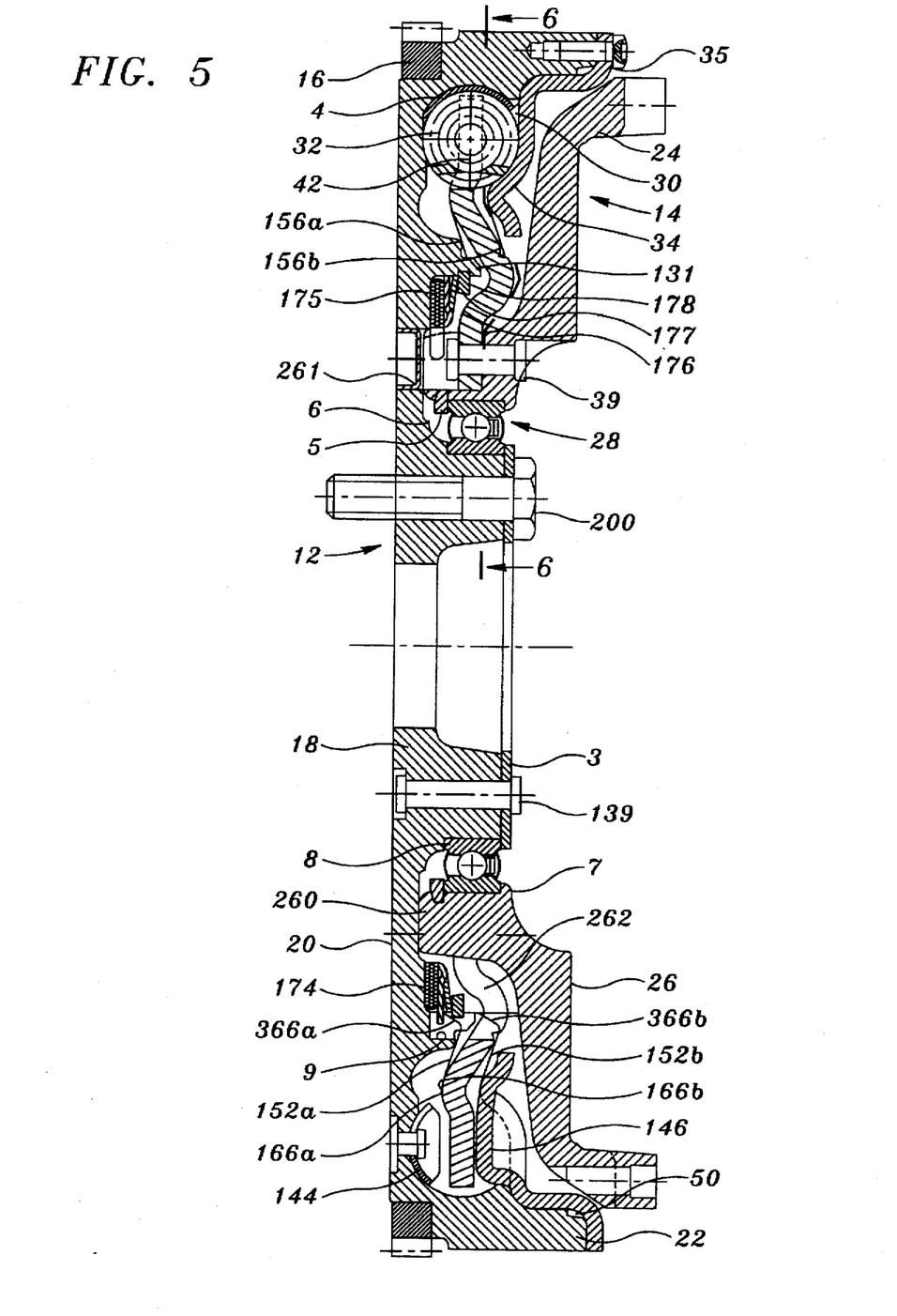
FIG. 5 is a view similar to FIG. 1 for a third embodiment, being taken on the line 5—5 in FIG. 6.
Figure 7:
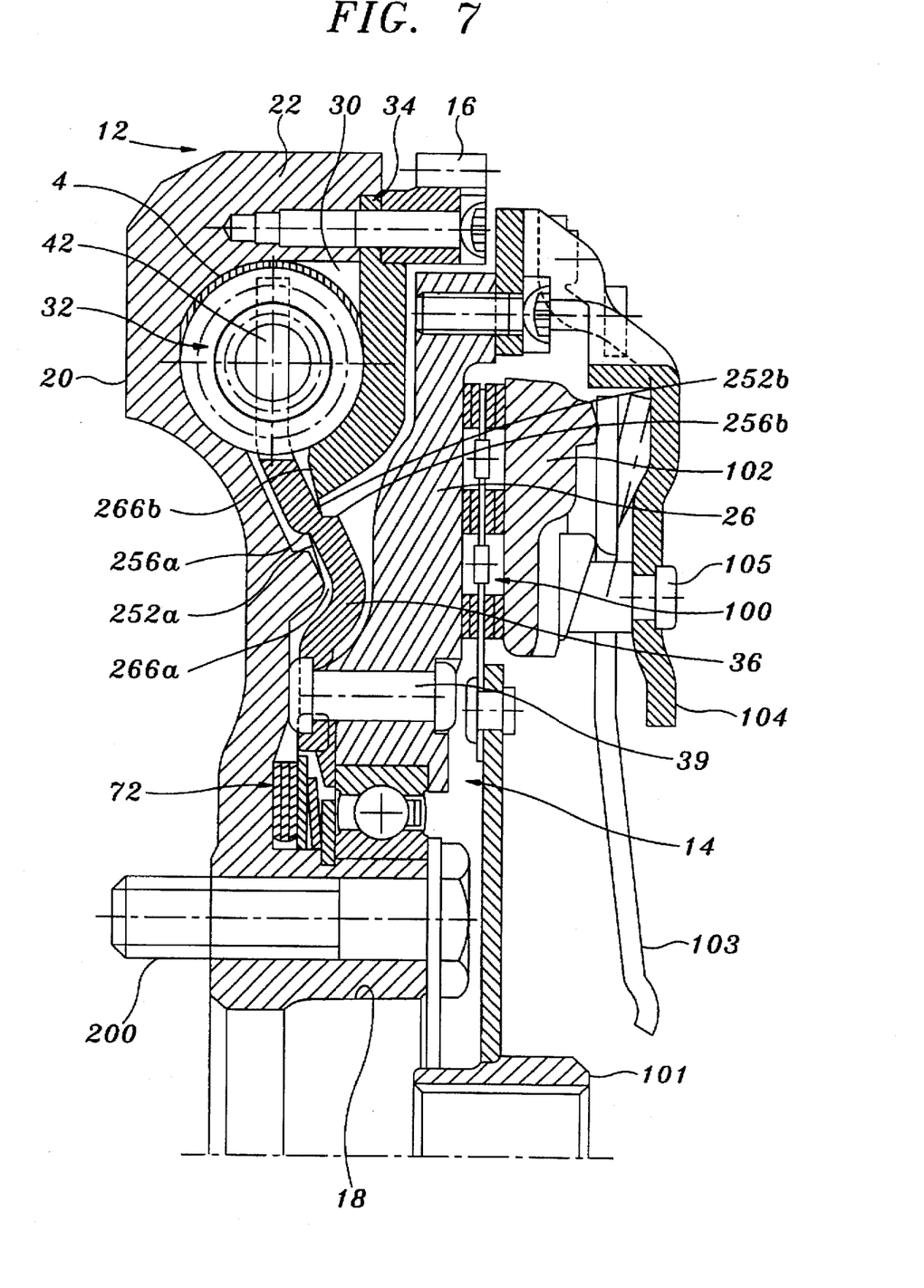
FIG. 7 is a half view similar to FIG. 1, for a fourth embodiment.

In the said Figures, the first element 12, which has the general form of a plate, carries an external toothed crown 16 which is arranged to cooperate with the starter of the vehicle (not shown), together with a central hub 18 which is arranged to be fixed on the end of the crankshaft (not shown) of the internal combustion engine of the vehicle, typically by means of studs which can be seen in FIG. 4 for example, and in FIGS. 5 and 7 in which they bear the reference numeral 200.

The first rotating element 12 consists essentially of a plate 20 and an axially orientated cylindrical peripheral annular skirt portion 22, which partly surrounds a cylindrical peripheral annular skirt portion 24 that forms an axial extension of the main portion, in the form of a plate 26, of the second rotating element 14, which is mounted for rotation on the hub 18 through a bearing 28, which is here in the form of a rolling bearing.

In this example, the skirt portions 22 and 24 are integral with their associated plates 20, 26.

In this example, the plate 26 constitutes the reaction plate of a clutch in the manner described in the document GB-A-2 219 647.

It will be recalled that the clutch also includes a clutch friction wheel which is fitted with friction liners, together with a pressure plate which is typically acted on by a diaphragm that bears on a cover plate fixed on the free end of the skirt portion 24 of the mass 14.

The clutch friction wheel is coupled to a hub, mounted on the input shaft of the gearbox for rotation with it. When the clutch is engaged, the friction liners of the clutch friction wheel are gripped between the pressure and reaction plates of the clutch, so that the torque is transmitted from the engine to the input shaft of the gearbox.

In order to disengage (declutch) the clutch, the diaphragm is acted on by pulling or pushing on the ends of the fingers of the said diaphragm, so as to release the friction liners of the clutch friction wheel as described in the above mentioned document. For more details, reference should be made to FIG. 7, in which the clutch friction wheel bears the reference numeral 100, the hub the reference numeral 101, the pressure plate the reference numeral 102, the diaphragm the reference numeral 103, and the cover plate the reference numeral 104.

In that Figure, a thrust is exerted by a clutch release bearing (not shown) on the ends of the fingers of the diaphragm 100, so as to release the clutch. The diaphragm 103 is, in that Figure, mounted for pivoting movement on the cover plate 104, in this case by means of support bars 105.

The damped flywheel, which is commonly referred to as a double damped flywheel, thus comprises two coaxial masses, namely the first rotating element 12 and the lo second rotating element 14, which are mounted for rotation of one with respect to the other, the first mass 12 being mounted on the internal combustion engine of the vehicle for rotation with it, while the second mass 14 is arranged to be mounted, through the clutch, for rotation with the input shaft of the gearbox.

The masses 12, 14 are mounted for rotation of one with respect to the other against the action of the above mentioned damping means 32, and against at least one complementary friction means 72 which works axially between the two masses.

The plates 20, 26 and the skirt portions 22 and 24 define an external annular housing 30, which is arranged to receive the resilient damping means 32, the latter consisting in this example of a set of concentric helical springs, acting circumferentially and arranged in annular sectors. These springs extend generally over 180° in this example.

The first rotating element 12 also includes an internal radial disc 34, which extends radially from the skirt portion 22 towards the axis X—X of the assembly.

The housing 30 is thus mostly bounded by the components 20, 22, 34, which in this example are part of the first rotating element 12.

To this end the disc 34, which is of metal in this example, is coupled in rotation to the external skirt portion 22. This disc 34 has a sinuous profile, and is extended at its outer periphery by an axially orientated annular flange which is in contact with the inner periphery of the skirt portion 22, and by a radial flange 35 which forms an extension of the said axial flange.

This radial flange 35 is in contact with the free end of the skirt portion 22. It is formed locally with holes for the passage, through the latter, of screws for fastening it to the skirt portion 22, as can be seen in particular in FIGS. 1 and 3. The said flange 35 thus constitutes a fastening flange.

The second rotating element 14 also includes a disc 36, which extends radially outwards and which is coupled to it in rotation by means of rivets 39 through a radially oriented fastening zone, and which extends radially into the housing 30 defined at the outer periphery of the damped flywheel and in the central annular space defined between flat surface portions 38 and 40, in facing relationship with each other, of the plates 20 and 26.

The housing 30 is thus also partly defined by the disc 36, and constitutes a cavity, which in this example is partially filled with grease for lubricating the springs of the resilient means 32, so as to prolong the useful working life of the damper while improving its operation. The disc 36 in this example is of metal, and is made by blanking and press forming.

Within the sealed housing 30, the outer edge of the disc 36 includes external radial lugs 42 which are arranged to act as end abutments, for engagement with the circumferential ends of the concentric coil springs of the said resilient means 32.

The lugs 42 of the disc 36 lie between abutment elements 144 of the plate 20, in facing relationship with each other, and abutment elements 146 of the disc 34 of the rotating element 12, in facing relationship with each other.

The abutment elements 144, 146 serve to engage the circumferential ends of the springs of the resilient means 32. These abutment elements are defined, respectively, by metallic members 144, which are sealingly fastened to the plate 20 by riveting, and by local press-formed deformations 146 in the disc 34, and it is for this reason that, in the lower part of FIG. 1, the said springs have been omitted so that these abutment elements can be better seen.

Accordingly, the plate 20 and the disc 34 constitute guide rings for the springs of the resilient means 32, while the disc 36 constitutes a damper plate disposed between the plate 20 and the disc 34.

In the well known way, during relative movement between the two masses 12 and 14, the arms 42 act on the springs of the resilient means 32, the circumferential ends of which are in abutment on the abutment elements 144, 146, in this example through thrust inserts 135 of plastics material, so that the said concentric springs are compressed.

The innermost spring 132 is of opposite hand to the two other springs of the resilient means 32, and is shorter than these latter. The spring 132 is tightly fitted on one of the inserts 135, and acts to prevent impact at the end of the relative motion between the two masses 12, 14.

Accordingly it is carried by one of the thrust inserts 135, and caused to cooperate with the other thrust insert 135 so as to be compressed, at the end of the said relative movement, between the two thrust inserts 135, each of which is associated with one of the circumferential ends of the outer springs of the resilient means 32.

In this example, the outer springs of the resilient means 32 carry pads (FIG. 2) which are arranged to make contact with the inner periphery of the skirt portion 22, so as to prevent wear in the said springs, the circumferential ends of which engage on the abutment elements 144, 146 and the lugs 42 through thrust inserts (FIG. 2). The housing 30 thus supports the coil springs of the resilient means 32 radially.

It will be noted that the plate 20 is dished in the region of the resilient means 32, so as to accommodate the springs of the latter.

The plates 20 and 26, with their skirt portions 22 and 24, are preferably made by a moulding process. The plate 26 is typically in the form of a casting.

The annular housing 30, which is open inwardly, is sealed by means of an O-ring seal 50, which is interposed between the inner periphery of the skirt portion 22 and the fastening flange 35 of the disc 34, and, in accordance with the invention, by means of two rings 52A and 52B which are disposed on either side of the disc 36 of the second element 14.

In FIGS. 1 to 3, the two rings 52A and 52B are two identical components which, in their natural position prior to being fitted into the damped flywheel in the position shown in FIG. 3, are in the form of flat, annular metal rings. These metal rings 52A, 52B are relatively thin, and thus have some degree of flexibility.

In the fitted position, each ring 52A is in axial compression, directly between a support surface of the first rotating element 12 and a second support surface which is part of the disc 36 of the second rotating element 14.

These support surfaces are continuous, being formed directly on two components of the first rotating element 12 and on the disc 36 of the second element 14.

More particularly, in FIGS. 1 to 3 the circular inner edge 54A of the first ring 52A is in radial engagement against the base 56A of a shoulder which is formed in a surface portion 44 of the plate 20 of the first element 12, which is defined by a cylindrical, axially orientated, engagement surface 58A and by a conical support surface 60A, which extends from the surface 58A generally radially away from the axis of the assembly. In a modification, the support surface 60A may extend radially.

A first surface 62A of the ring 52A is thus able to cooperate sealingly with the conical support surface 60A, while the opposite, second, surface 64A of the ring 52A cooperates with a support surface 66A which is defined by the apex of a ridge formed on the facing portion of a surface 68A of the internal disc 36.

The base 56A and the ridge 66A are circular and continuous, being offset axially from each other, the ridge 66A being spaced axially further away from the plate 26 than is the base 56A.

Close to the ridge 66A, the disc 36 has a recess 70A for preventing any jamming of the ring 52A between its abutments 66A, 56A.

In symmetrical relationship with the foregoing, the circular outer edge 54B of the second sealing ring 52B is in radial engagement in the base 56B of a shoulder formed in a portion of the surface 46 of the disc 34 of the element 12.

The base 56B lies at the inner periphery of the disc 34. The shoulder 56B of the disc 34 is defined by an axially orientated cylindrical support surface 58B, and by a conical support surface 60B which, in this example, extends radially towards the axis of the assembly.

The ring 52B is arranged to cooperate with the said support surface 60B through the facing portion of its first surface 62B.

As to its second surface 64B, this cooperates with a continuous support surface defined by the apex of an annular ridge 66B, which is formed in the surface portion 38B of the disc 36, which is extended radially inwards by a recess 70B identical with the recess 70A. The ridge 66B is offset axially with respect to the shoulder 56B. This ridge is closer to the plate 26.

The ridge 66B lies radially inwardly of the ridge 66A, while the base 56A in the plate 20 is disposed radially inwardly of the base 56B in the disc 34.

The two metallic sealing rings 52A and 52B thus have parallel frusto-conical profiles before they are fitted, and they are in opposed elastic engagement so as to cooperate sealingly with the corresponding components of the first and second rotating elements 12 and 14.

Correct radial positioning of the rings 52A and 52B is ensured by the presence of the radial shoulder 56A, 56B cooperating with the circular edge 54A and 54B respectively of the rings 52A and 52B.

The said radial shoulders 56A and 56B thus oppose the rings 52A, 52B, which are easy to fit because of the cylindrical abutment surfaces 58A and 58B.

It will be noted that the cylindrical centring support surfaces 58A, 58B define an obtuse angle with their conical support surfaces 60A, 60B.

In the position of axial precompression, as is shown in FIG. 3, retention in the correct position, and sealing cooperation, are also ensured by the fact that the apex of each of the support ridges 66A, 66B is offset axially with respect to the base 56A, 56B of the radial shoulder (FIGS. 3 and 4).

This offset is of course so selected that the sealing rings cannot evert.

It will be appreciated that the conical support surfaces 60A, 60B, as well as the recesses 70A and 70B, enable the sealing rings 52A, 52B to have the desired frusto-conical profile.

In the embodiment of FIG. 1, a friction damping device 72 is mounted on the central hub 18, being interposed axially between the plate 20 and the inner ring of the ball bearing 28.

This device comprises, in axial succession going from the plate 20 to the rolling bearing 28, a friction ring carried freely on the hub 18, an application ring carried on the hub 18 for rotation with the latter, for example by means of a flat or a set of teeth, an axially acting resilient ring, which in this example is of the Belleville ring type and which bears on the application ring, and a thrust ring which is located axially between the inner ring of the bearing 28 and a shoulder of the hub 18.

The plate 26 has axially orientated teeth or tenons which penetrate, with a clearance, into slots which are formed in the friction ring at its outer periphery. In this way a coupling of the tenon and mortice type, with a clearance, is formed.

During the relative angular displacement between the plate 26 and the plate 20, the friction ring, which is elastically prestressed by the resilient ring of the Belleville ring type, is caused to engage frictionally against the plate 20 and the application ring, after the clearance between the tenons and the mortices has been taken up.

The invention results in radial space existing between the sealing rings 52A, 52B and the friction device 72, in such a way that it is possible to fit a further friction device 74 radially between the annular housing 30 and the first friction device 72 (FIG. 4).

This friction device 74 is interposed axially between the disc 36 and the plate 20. In this example it comprises a friction ring adhesively bonded on to a metallic application ring, which is provided with axial lugs that penetrate, in complementary manner, into apertures formed in the disc 36.

A resilient ring, of the Belleville ring type, is interposed axially between the application ring and the disc 36.

In this way, during the relative motion between the plates 20 and 26, the friction ring is caused to rub frictionally against the plate 20 as soon as the said relative motion starts.

It will be noted that in FIGS. 3 and 4, the disc 36 is inclined axially between the ridges 66A, 66B, and that the thickness of the plate 26 is reduced in the region of its skirt portion 24 in facing relationship with the disc 34, the inner periphery of which is inclined axially towards the disc 36.

All of these arrangements, in combination with the recess formed in the plate 20 for mounting the resilient means 32, enable the axial size of the damped flywheel to be reduced.

It will be appreciated that the inclination of the disc 36 between its ridges 66A and 66B facilitates the fitting of the rings 52A, 52B, and also facilitates the assumption of a conical form by these rings, which are substantially parallel to each other after being fitted.

When the vehicle stops, the grease contained in the housing 30 cannot escape because of the rings 52A, 52B, and the same is true while the vehicle is travelling.

Thus, the grease cannot escape from the housing 30 so as to contaminate the friction devices 72, 74 and, possibly, also the reaction plate 26.

The present invention is of course not limited to the embodiments described.

In particular, the skirt portion 22 may be carried, by riveting or welding for example, on the plate 20, so that the housing 30 is defined by three components of the rotating element 12.

The skirt portion 22 is then preferably attached on the plate 20 by means of posts, which also enable the disc 34 to be secured.

This disc 34 may be welded on to the skirt portion 22, so that the presence of the seal 50 is no longer necessary.

The hub 18 may be integral with the plate 20 (as in FIG. 4), or it may be fastened by being screwed on to the plate (as in FIG. 1). The said hub 18 is thus fixed to the plate 20. The torsion damper may be of the same type as is described in the document DE-U-79 26 142. In that case, the disc 36 is fixed to a hub which is secured on the input shaft of the gearbox for rotation with the latter, while the disc 34 is extended inwards as far as the vicinity of the hub.

Only one row of springs is then provided. The disc 36 can of course have windows in the housing 30 in place of the lugs 42, for carrying the springs of the resilient means 32.

The engagement of the springs on the components 20 and 24 may be obtained by means of blocks attached on the plate 24 and disc 34.

In the case of an arrangement of the type described in the document DE-U-79 26 142, the assembly 12 may, for example, be attached on a plate which is fixed to the crankshaft of the engine of the vehicle, for example by means of a screwed connection. In this type of construction, the second assembly 14 has no reaction plate.

In a modified embodiment, the assembly 12 may carry the friction wheel of the clutch. In all cases, the disc 36 penetrates into the housing 30.

The sealed annular housing 30 can of course be filled with a viscous fluid, or with any other agent for lubricating the springs of the resilient means 32.

The plate 20 and the disc 34 (FIGS. 5 and 7) may be so configured as to hug the profile of the springs of the resilient means 32, as in the document GB-A-2 219 647. In all cases, the springs of the resilient means 32 work circumferentially between the first rotating element 12 and the disc of the second rotating element 14.

In FIG. 5, each of the outer coil springs of the resilient means 32 is able to make contact with an anti-wear member 4 (FIG. 6), having the shape of a chute, which is interposed radially between the said spring and the toroidal inner periphery of the skirt portion 22. In that Figure, the concentric springs of the resilient means 32 bear directly on the abutment elements 144 and 146, while the inner spring 132 is omitted. The housing 30 is closed internally by means of two sealing rings 152A, 152B which are substantially identical with each other. These rings are flat in their natural state, and are put into precompression after being fitted like the rings 52A, 52B, this being done in a manner to be described below.

In addition, the inner ring of the rolling bearing 28 is located axially, firstly at the front, by means of a shoulder 8 formed on the outer periphery of the hub 18, integral with the plate 20 of the first mass 12, and secondly at the rear, by means of a ring 3 which is secured by rivets 139 on the free end of the hub 18. This ring 3 serves for engagement of the heads of the studs 200 by which the first mass 12 is fastened to the crankshaft of the engine of the vehicle.

The outer ring of the rolling bearing 28 is located axially, firstly at the rear, by means of a shoulder 8 formed on the inner periphery of the reaction plate 26 of the second mass, and secondly, at the front, by means of a split ring 5, the outer periphery of which defines a wedge in a front face having a conical engagement surface, for cooperation with a complementary conical engagement surface formed in a groove 6, in which the ring 5 is fitted.

This groove 6 is formed in an axially oriented sleeve portion 264, which is made integral with the reaction plate 26 at its inner periphery towards the plate 20.

The rear face of the ring 5 is flat, for cooperation with the appropriate surface of the outer ring of the rolling bearing 28.

This arrangement makes the reaction plate 26 more robust. In this connection, the ring 5 can also be fitted behind the outer ring of the bearing 28, but in this case stress raisers can occur. By fitting the ring at the front, these risks are reduced. In addition, this enables the thickness of the reaction plate 26 to be reduced, as can best be seen in FIG. 5, with the benefit of reduced axial size.

It is then necessary to mount the friction device, which bears the reference numeral 174 here, radially outside the ring 5 and groove 6, and therefore also outside the sleeve portion 264. This axially acting device 174 comprises, as in FIG. 1 and considered in axial succession going from the plate 20 to the plate 26, a friction ring 175, a spacer ring 176, an axially acting resilient ring 177, and a circlip 178.

The ring 177, which in this example is of the Belleville ring type, bears on the circlip 178 so as to act on the ring 176 and grip the ring 175 between the plate 20 and the said ring 176.

To this end, the plate 20 has an axially oriented flange portion 131, radially outside the rivets 39 by means of which the disc 36 is fastened to the plate 26, and directed towards the disc 36. This flange portion 131 has an internal groove in which the circlip 178 is fitted. The internal bore of the said flange portion 131 has grooves 9, the base of which is closed by the plate 20. The ring 176, which is of metal in this example, has at its outer periphery tenons in the form of radial lugs, for complementary engagement in the grooves 9.

The ring 176 is thus coupled in rotation, with axial mobility, to the plate 20 by mating cooperation of the tenon and mortice type.

In this example, there are two grooves 9. These grooves 9 are in generally diametrically opposed relationship. This does of course depend on the application.

It will be noted that the Belleville ring 177 has internal radial fingers, directed towards the centre and penetrating between two consecutive bosses which are made by press forming at the inner periphery of the ring 176.

The ring 177 is thus prevented from rotation by mating cooperation of its fingers with the bosses of the ring 176, which is usually referred to as an application ring.

The ring 175 has, at its inner periphery, slots 275, 276 (FIG. 6) respectively, for accommodating axially orientated tenons 260 which are formed on the reaction plate 26 between two consecutive rivets 39, so as to give access to the heads of the rivets 39.

Figure 6:
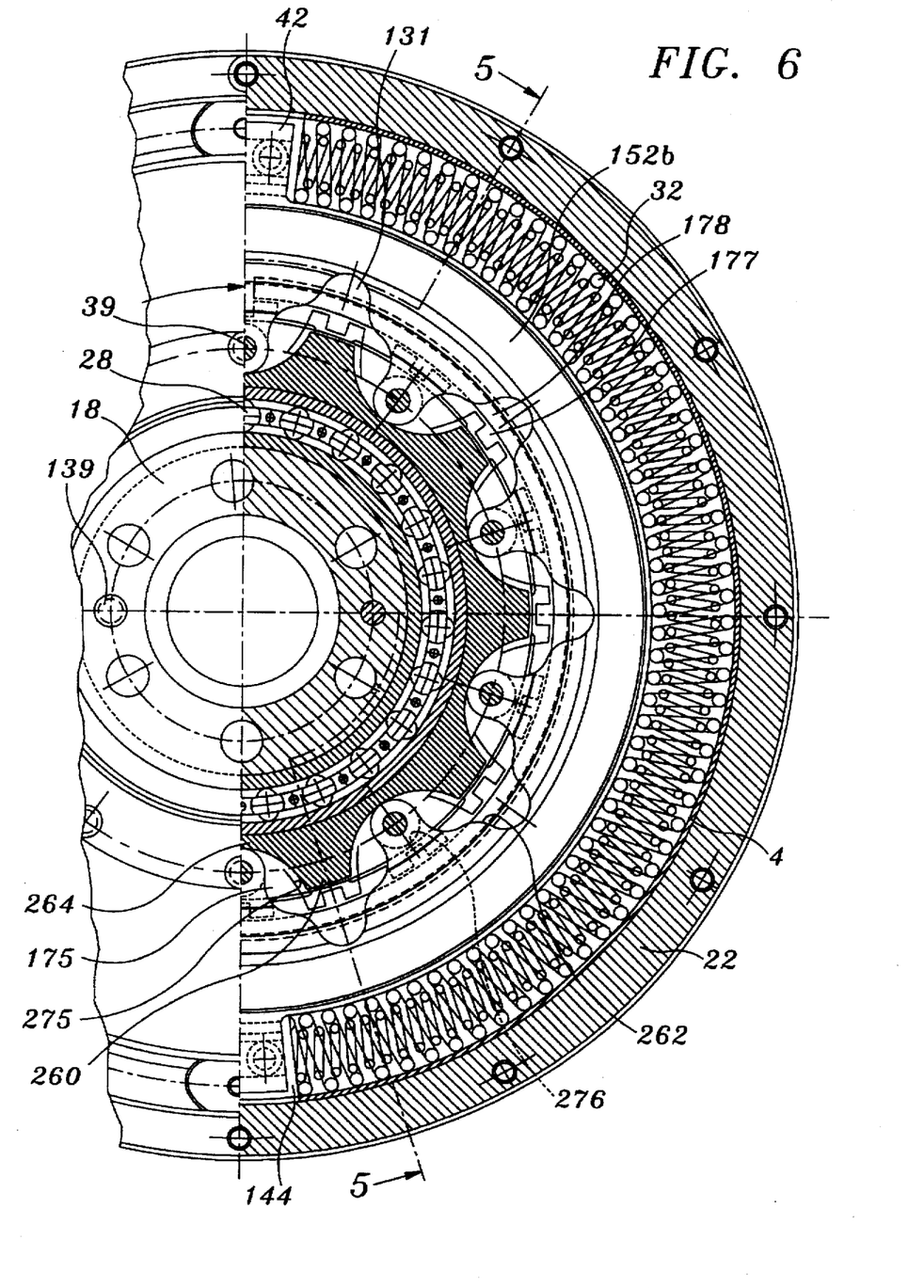
FIG. 6 is a view on the line 6—6 in FIG. 5, showing partly cut away.

The ring 175 is offset axially with respect to the heads of the rivets 39, and, because of the slots 276 which are open radially outwardly, it is possible to pass the tightening tool through the apertures 261 width are formed in the plate 20 for this purpose, so as to fix the disc 36 to the plate 26 by riveting.

The holes 261 are subsequently closed by means of bungs. The slots 275, which are open radially inwards, constitute mortices through which the tenons 260 pass with a circumferential clearance.

It will be appreciated that these tenons can easily be made by a milling operation, and this is why they have circular lateral edges. The tenons 260 project radially with respect to the rivets 39.

The edges of the slots 275 in the ring 175 are of convex form. Thus the ring 175, which is preferably made of a synthetic material, meshes, with a clearance, with the tenons 260 of the plate 26 and gives a differential friction effect (after the clearances have been taken up). The lateral edges of the tenons 260 and slots 275 have complementary profiles. The friction device 174, fitted axially between the plate 20 and 26, does not act on the said disc.

It will be noted that the tenons 260 are joined together at their inner periphery by the sleeve portion 264. These tenons 260 therefore rigidify the sleeve portion 264 directed towards the plate 20. In this way a very robust structure is obtained, with a sleeve portion 264 which extends axially in the opposite direction to the flange portion 131.

The flange portion 131 has a bead 156A at its outer periphery, constituting one of the shoulders in accordance with the invention. In this embodiment, the disc 36 has a ridge 166A at its outer periphery, on that one of its surfaces which faces towards the plate 20, and a shoulder 156B formed radially further inwardly on that one of its surfaces that faces towards the plate 26. The disc 34 has a ridge 166B which lies on generally the same pitch circle as the ridge 166A, with the shoulders 156A and 156B being located on generally the same pitch circle.

Thus, the sealing ring 152A is fitted under axial compression directly between its two support surfaces, and it bears, through its inner edge against the shoulder 156A formed in facing relationship with it on the first rotating element 12, and through its outer edge on the annular ridge 166A formed in facing relationship with it on the disc 36 of the second rotating element 14. Similarly, the sealing ring 152B bears through its circular outer edge on the annular ridge 166B which is formed in facing relationship with it on the disc 34 of the first rotating element 12, while it engages through its circular inner edge on the shoulder 156B which is formed in facing relationship with it on the disc 36 of the second rotating element 14.

The ridges 166A, 166B are offset axially with respect to the shoulders 156A, 156B, towards the plate 20 of the first mass 12.

Each shoulder 156A, 156B constitutes the apex of a conical engagement surface which extends radially away from the axis of the assembly, with this conical surface being joined to an axially oriented cylindrical abutment surface. Both of the conical engagement surfaces are inclined towards the reaction plate 26. They form an acute angle with their associated cylindrical abutment surface.

Accordingly, the metallic sealing rings 152A, 152B are centred, as in FIG. 1, by the cylindrical abutment surfaces, and in this example the disc 36 has, in its inner periphery, slots 262 which interrupt the said cylindrical abutment surface, and therefore also the said shoulder 156B.

In the same way, the grooves 9 interrupt the shoulder 156A and its cylindrical abutment surfaces.

Advantage is taken of these interruptions to give the sealing rings 152A, 152B inclined lugs 366A and 366B respectively, which penetrate into the grooves 9 and the radially inwardly open slots 262, respectively.

In this way rotation is prevented by mating cooperation, the said lugs 366A and 366B being inclined towards the plate 20.

Thus movement of the resiliently deformable lugs 366A, like that of the lugs 366B, can be prevented by means of the circlip 178.

It is therefore possible to build a sub-assembly comprising the plate 20, the friction device 174 and the sealing ring 152A.

The disc 36, equipped with the other sealing ring 152B, is subsequently fitted, the said ring being prevented from moving by fitting of the disc 34. It is of course possible to integrate the disc 36 into the sub-assembly 20-174, 152A, with the ring 152B then being fitted between the disc 34, fixed on the plate 20, and the disc 36, the rings 152A, 152B being unable to escape by virtue of their lugs 366A, 366B.

It will be noted that the outer periphery of the plate 26 is cut away so as to accommodate the skirt portion 22 with its disc 34, and so that the resilient means 32 can be fitted.

The thickness of the reaction plate 26 accordingly decreases in the radial direction away from the axis of the assembly.

In addition, the root zone of the sleeve 264 at the plate 26 is defined by a radiused portions. This gives an arrangement which is very compact in the axial direction.

In FIG. 7, it is the disc 36 that has the two shoulders 256A and 256B for the two sealing rings 252A, 252B. These shoulders have a configuration similar to those in FIG. 1, and accordingly they have an axially oriented cylindrical abutment surface which is joined to a conical support surface, with the conical support surface of the shoulder 256A extending towards the axis of the assembly and being inclined towards the plate 26, while the conical support surface of the shoulder 256B extends radially away from the axis of the assembly, and is inclined axially towards the plate 20. The conical support surfaces define an obtuse angle with their associated cylindrical centring surfaces.

The shoulders 256B, 256A are offset axially with respect to their associated ridge 266A, 266B.

The bases of the shoulders 256A and 256B are offset radially with respect to each other. The plate 20 has an annular engagement ridge 266A, while the disc 34 has an annular engagement ridge 266B.

Thus, the sealing ring 256B bears through its outer edge on the ridge 266B of the first rotating mass 12, while it bears through its inner edge against the base of the shoulder 256B of the second rotating mass 14.

The sealing ring 252A bears through its outer edge against the base of the shoulder 256A of the disc of the second rotating mass 14, and through its inner edge against the annular ridge 266A of the first rotating mass 12.

As will be understood from the foregoing, it is possible to make both of the sealing rings 252A, 252B from a single common workpiece by press forming. The ring 252A is formed from the unwanted material pressed out from the centre of the ring 252B, and this is why the bases of the shoulders 256A and 256B are slightly offset radially from each other.

In all of the embodiments, advantage is taken of the inclination of the disc 36 between its lugs 42 and its zone by which it is fixed to the reaction plate 26.

It will be noted that, in FIGS. 5 and 7, the inclined zone of the disc 36 is joined through a rounded portion to the zone in which the disc 36 is fixed to the plate 26.

This is necessary in order to accommodate the flange portion 131 and the ridge 266A, the said rounded portion being located at the radial level of the said flange portion 131 and the said ridge 266A. In FIGS. 5 and 7, the sealing rings are substantially parallel after being fitted, as in FIG. 1.

We claim:

1. A torsion damper, comprising a first element (12) and a second element (14) coaxial with each other and defining between them a sealed annular housing (30), which receives, firstly, a circumferentially acting resilient damping means (32) interposed between the two rotating elements (12, 14), and secondly, a lubricating agent for said resilient damping means, wherein the annular housing (30) is defined by at least two components (20, 34) of the first of the rotating elements (12, 14), while the second rotating element comprises a disc (36) which penetrates into the housing, and wherein sealing members (52A, 52B–152A, 152B–252A, 252B) delimit the annular housing (30) radially inwardly, said sealing members (52A, 52B) comprising two coaxial sealing rings (52A, 52B–152A, 152B . . . ), disposed on either side of the disc (36) of the second rotating element (14), and each of which is in engagement through one of its surfaces (64A, 64B) against a support surface (66A, 66B . . . ) associated with the disc (36) of the second rotating element, and through its other surface (62A, 62B) against a support surface (60A, 60B) associated with the first rotating element, wherein each sealing ring (52A, 52B) is mounted axially directly between its two support surfaces in such a way as to have the form of a frustum of a cone, and is arranged to bear sealingly, through one of its circular edges (50A, 54B . . . ), against a shoulder (56A, 56B . . . ) formed in facing relationship on one of the elements comprising the first rotating element (12) and the disc (36) of the second rotating element, and through its other edge on an annular ridge (66A, 66B . . . ) formed in facing relationship with the other one of the elements comprising the first rotating element (12) and the disc (36) of the second rotating element (14), in that each each annular ridge (66A, 66B , . . . ) is offset axially with respect to said shoulder (56A, 56B . . . ), and in that said sealing rings (52A, 52B) are substantially parallel.

2. A torsion damper according to claim 1, characterised in that the two sealing rings (52A, 52B) are substantially identical.

3. A torsion damper according to claim 1, characterised in that each radial shoulder (56A, 56B) comprises an axially oriented cylindrical abutment surface (58A, 58B) and a support surface (60A, 60B) which extends radially and which defines between the said surfaces a shoulder base (56A, 56B) against which the associated ring (52A, 52B) is caused to bear through one of its circular edges (54A, 54B).

4. A torsion damper according to claim 3, characterised in that each shoulder (56A, 56B) has a conical support surface (60A, 60B) which, in transverse cross section, defines an obtuse angle with the axially oriented cylindrical engagement surface (58A, 58B).

5. A torsion damper according to claim 4, characterised in that the disc (36) of the second rotating element (14) is inclined axially between its two annular support ridges (66A, 66B).

6. A torsion damper according to claim 1, characterised in that it consists of a torsion damped flywheel for a motor vehicle, the first rotating element of which comprises a plate (20) adapted to be mounted on the internal combustion engine of the motor vehicle for rotation thereby, while its second rotating element is adapted to be mounted on the input shaft of the gearbox for rotation therewith, and in that the plate (20) of the first rotating element (12) carries at its outer periphery an axially oriented skirt portion (22), to the free end of which there is sealingly fixed a disc (34) which extends radially inwards, in such a way that the annular housing (30) is mostly delimited by the said plate (20), the skirt portion (22) and the disc (34), while the disc (36) of the second rotating element (14) is fixed to a plate (26) that constitutes the reaction plate of a clutch.

7. A torsion damper according to claim 6, in which the plate (20) of the first rotating element (12) is fixed to a central hub (18) that carries a first friction device (72), characterised in that a second friction device (74) is interposed radially between the annular housing (30) and the first friction device (72), with the said second friction device (74) working axially between the disc (36) of the second rotating element (14) and the plate (20) of the first rotating element (12).

* * * * *